United States Patent [19]

Barr, Jr. et al.

[11] Patent Number: 4,580,268

[45] Date of Patent: Apr. 1, 1986

[54] CRYOGENIC INFRARED LASER IN DEUTERIUM

[75] Inventors: Thomas A. Barr, Jr., Huntsville; William E. McCracken, Elkmont; William B. McKnight, Huntsville, all of Ala.

[73] Assignee: The United States of America as represented by the Secretary of the Army, Washington, D.C.

[21] Appl. No.: 446,744

[22] Filed: Dec. 3, 1982

[51] Int. Cl.$^4$ .............................................. H01S 3/30
[52] U.S. Cl. ........................................ 372/4; 372/34; 372/55
[58] Field of Search ................. 372/55, 34, 32; 378/35, 378/4

[56] References Cited

PUBLICATIONS

McKnight et al.; "Laser Action at 3 μm in a Hydrogen Discharge"; Applied Optics, vol. 21, No. 3, Feb. 1, 1982, p. 357.

Barr, Jr. et al; "Mid-Infrared Lasers in Hydrogen and Deuterium"; Appl. Phys. Lett. 41(2), Jul. 15, 1982.

Kim et al; "A New Technique for Fabricating Cryogenic Laser-Fusion Targets Using Cold-Gas Jets"; Appl. Phys. Lett. 34(4), Feb. 15, 1979.

Dreyfus et al; "Molecular-Hydrogen Laser; 1098–1613 Å"; Phys. Rev. A., vol. 9, No. 6, Jun. 1974.

Primary Examiner—Leon Scott, Jr.
Attorney, Agent, or Firm—Anthony T. Lane; Robert P. Gibson; James T. Deaton

[57] ABSTRACT

A cryogenic infrared laser in deuterium in which an output is produced by exciting the deuterium after it has been cooled to cryogenic temperature with a high voltage pulse discharge to produce laser action in three or more lines as output pulses with varying lengths and with wavelengths in the 4 μm band and including 4.52 μm, 4.60 μm, and 4.71 μm.

5 Claims, 3 Drawing Figures

CRYOGENIC INFRARED LASER IN DEUTERIUM

DEDICATORY CLAUSE

The invention described herein may be manufactured, used, and licensed by or for the Government for governmental purposes without the payment to us of any royalties thereon.

CROSS REFERENCE TO RELATED APPLICATION

This application is related to applicants' copending application Ser. No. 446,743, filed Dec. 3, 1982 in that they are each concerned with producing a plurality of laser outputs from a gas by applying an electrical potential and utilizing similar apparatus.

BACKGROUND OF THE INVENTION

In the past, various lasers have been provided that have had limitations of one nature or another such as using poisnous gases, using gases that are expensive, or other various aspects of the lasers that limit their use and application. Therefore, there is still a need for a laser that utilizes a single gas that is readily available and can be acted upon directly to provide one or more laser outputs.

Therefore, it is an object of this invention to provide a mid-infrared laser in deuterium.

Another object of this invention is to provide a laser in deuterium that can be simply pumped by applying an electrical potential across the gas to produce an output.

Still another object of this invention is to provide a laser which can be used in any pulsed low power laser application in the 4 $\mu$m band.

Still another object of this invention is to provide a laser that can be used in laser guidance, jamming enviroments, or other pulsed laser applications.

Other objects and advantages of this invention will be obvious to those skilled in this art.

SUMMARY OF THE INVENTION

In accordance with this invention, an infrared laser in deuterium is provided that lases in the 4 $\mu$m band and is produced by placing the deuterium gas in a lasing tube with reflecting mirrors at opposite ends with one of the mirrors having an output, cooling the deuterium cryogenically to a temperature below "room temperature" to a temperature of about 100° K. and then applying a high voltage discharge across the cooled deuterium to produce a pulse output at a multiplicity of wavelengths.

DESCRIPTION OF THE PREFERRED EMBODIMENT

Figure 1:
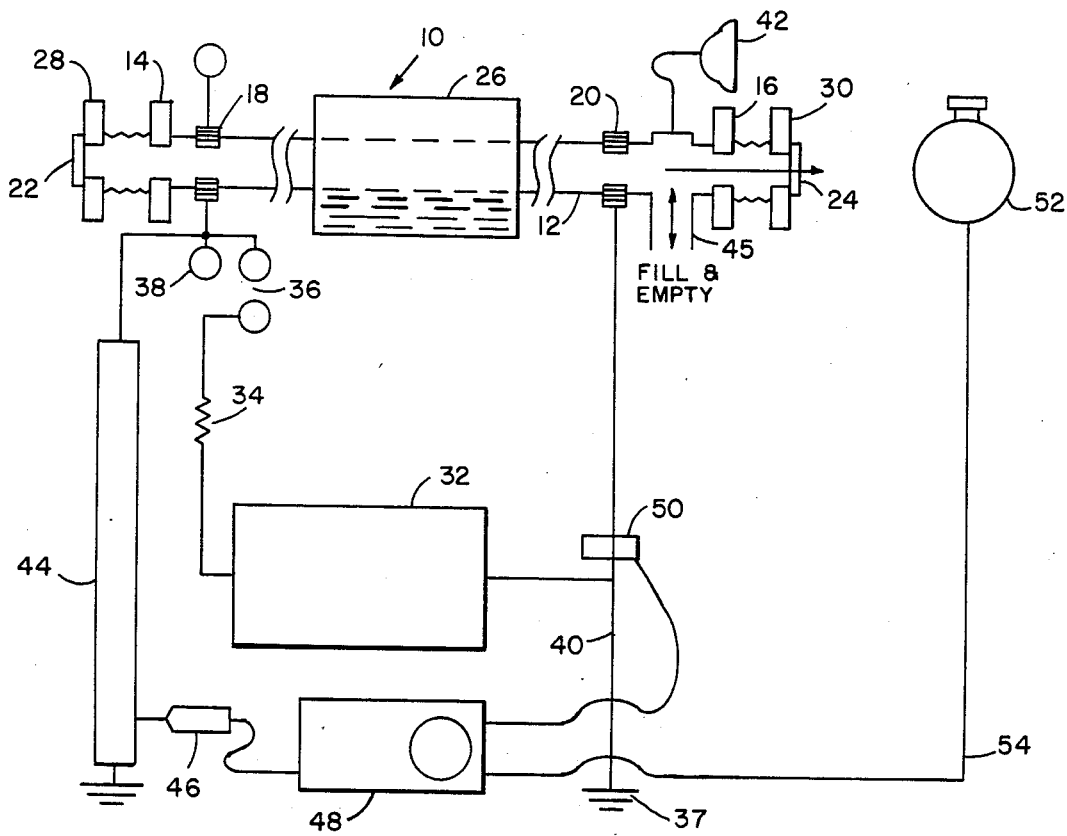
FIG. 1 is a schematic illustration of the system used in producing the laser output from deuterium.

Referring now to FIG. 1, the system and apparatus 10 for carrying out and producing a cryogenic infrared laser in deuterium in accordance with this invention consist of a pyrex conical glass pipe 12 which is about 1 inch in diameter and about 11 feet long. This tube 12 also includes end Ts 14 and 16, discharge electrodes 18 and 20, mirror assemblies 22 and 24, and a cryogenic insulating box and lid 26 that contains liquid nitrogen and cold nigrogen vapors to cool a major portion of tube 12 and the gas that is placed therein. The cavity output end at 24 uses a flat sapphire window mirror, dielectric coated to at least 80% reflectivity in the 4.7 $\mu$m region. Concave pryex mirror 24, 20-m radious of curvature, dielectric coated to 99+% reflectivity at 4.7 $\mu$m is used to form the other end of the cavity. Both mirrors at 22 and 24 partially transmit in the visible, and a He-Ne laser was used for alignment of the cavity including mirrors 22 and 24 that are mounted on adjustable seal mounts 28 and 30 for appropriate adjustment of the mirrors. In this laser, mirrors 22 and 24 must be aligned after cavity 12 has been evacuated and filled with the deuterium gas and with the deuterium gas cooled to a cryogenic temperature. A Marx bank 32 is connected through resistor 34, discharge peaking spark gap 36 and corona ring 38 that is connected to the high voltage end of the circuit through electrical discharge electrode 18. Electrical discharge ring 20 is connected to ground 37 as well as Marx bank 32 through connection 40. Marx bank 32 consists of four stages, each a 0.032-$\mu$F, 125-kV fast discharge capacitor. Normal charge voltage for the Marx bank was within the range between 60 and 75 kV with corresponding erected voltages of 240–300 kV. Voltage applied to the laser was measured using a 10:1 RC voltage divider 44 that was connected to corona ring 38 and through high voltage probe 46 to a Tektronix 7834 storage oscilloscope 48. Voltage divider 44 can be used with a Tektronix model P6015 probe 46 to provide an overall attinuation of 10,000:1. To measure the ground return circuit at 40, a current loop 50 is provided such as a Pearson model 110 current transformer which is connected to oscilloscope 48 for making this measurement. Also, laser tube 12 is provided with a conventional pressure gauge 42 that has a reading from about 0–20 Torr and is connected to the tube in a conventional manner. Also, a filling and emptying passage 45 is provided for placing the deuterium gas into the laser tube in a conventional manner. The output produced by laser 10 was detected on a gold-doped germanium, liquid nitrogen cooled detector 52 that has its output connected through lead 54 to oscilloscope 48.

Typical operating conditions for this laser are deuterium gas pressure, of about 1–8 Torr and preferably at 2 Torr; current, 100–1200 A; run voltage (as opposed to initiation voltage) 10–50 kV; discharge duration up to several $\mu$ sec. Current, run voltage and discharge time were primarily dependent on the discharge series resistors 34, which were wire wound and ceramic coated and ranged in value from 25–1000$\Omega$. Most experiments were done at cryogenic temperatures and preferably at about 100° K. since this laser in deuterium was not found to operate at room temperature. Also, the mirrors must be aligned after the deuterium gas has been cooled to the cryogenic temperature.

Figure 2:
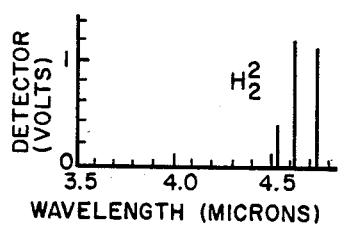
FIG. 2 illustrates the location and relative intensities of the infrared laser lines in deuterium.
Figure 3:
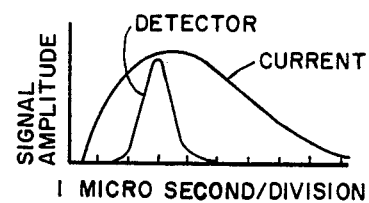
FIG. 3 is a graph illustrating the typical detector and current oscilloscope signals showing termination of laser action prior to current decay.

In operation, laser tube 12 is evacuated in a conventional manner and then filled with deuterium gas to pressures between 1 and 8 Torr and preferably at 2 Torr. Next, the deuterium gas is cooled to a cryogenic temperature and preferably about 100° K. The laser mirrors 22 and 24 are then aligned by any standard means such as by the use of a helium neon laser. With mirrors 22 and 24 aligned, the capacitors of Marx bank 32 are charged in parallel and then discharged in series across spark gap 36 and electrodes 18 and 20 through the cryogenically cooled deuterium gas in laser tube 12. This electric discharge from electrode 18 to electrode 20 properly excites the deuterium gas to produce laser output through the output window in mirror 24 and is detected by detector 52. The output produced by detector 52 is recorded on oscilloscope 48 and also, current loop 50 detects its signal at the output and provides an input to oscilloscope 48 for recording the signal at the output. Also, oscilloscope 48 records the signal from the input to the system through voltage divider 44 and high voltage probe 46. The deuterium laser output is an infrared laser output in the 4 $\mu$m band and has been identified as being in a set of three lines. The three laser lines have been identified at 4.52 $\mu$m, 4.60 $\mu$m, and 4.71 $\mu$m. These specific wavelengths were found when the deuterium was at a pressure of 2 Torr with laser tube 12 being cooled with the deuterium gas therein being at a temperature of approximately 100 degree K. These spectra, viewing the location and relative intensities of the lines are shown in FIG. 2. FIG. 3 also shows spectra of a typical detector and current oscilloscope signals illustrating termination of laser action prior to current decay.

The laser lines in deuterium form a similar pattern to those of hydrogen as reported in our copending application Ser. No. 446,743, and by analogy it is assumed that they are in the closely spaced triplet states; however, we are unable to make a confident spectroscopic assignment due to lack of published coefficients for the $C^3\pi_u$ state. An independent evaluation of the deuterium lines identifies them as the P(1) lines of the (4-3), (5-4), and (6-5) bands of the a-c transitions with calculated wave numbers of 2128, 2180, and 2231, which are reasonably close to our measured values of 2123, 2174, and 2212, the largest discrepancy being 19 cm in the case of the 4.52 $\mu$m line. By following this lead and by including the $\omega_e y_e$ term in the spectroscopic series, we have reconciled the computed and measured wave numbers to about 2 cm$^{-1}$. Any such series, however, is tentative being based only on the known $\nu_{oo}=95185.3$ and on the three deuterium lines.

Attempts were made to find similar lines in deuterium hydride under a wide range of conditions, including those for which laser action occurred in hydrogen and deuterium; no such lines were found.

We claim:

1. An infrared laser in deuterium which lases in some lines of the 4 $\mu$m band and is produced by applying a high voltage pulse electric discharge means along a low loss laser cavity means, said laser cavity means containing deuterium, means for cooling said deuterium in said laser cavity means to cryogenic temperature and at a pressure between about 1 and 8 Torr, reflective cavity mirrors in opposite ends of the cavity and one of said cavity mirrors having an output thereat, whereby the deuterium is caused to lase when a high voltage electric discharge pulse from said high voltage pulse electric discharge means is applied through said deuterium to produce laser output in said band at said cavity mirror having said output.

2. An infrared laser in deuterium as set forth in claim 1, wherein said high voltage electric discharge pulse has a current value from 100–1200A, a run voltage from 10–50 kV, and a discharge duration up to several $\mu$ sec to cause said laser output to occur along a multiplicity of lines producing output pulses with varying lengths.

3. An infrared laser in deuterium as set forth in claim 2, wherein said output has wavelengths including 4.52 $\mu$m, 4.60 $\mu$m, and 4.71 $\mu$m.

4. An infrared laser in deuterium as set forth in claim 1, wherein said high voltage pulse is applied to said deuterium by a Marx bank through a resistor to control the length of the current pulse applied by said high voltage pulse.

5. An infrared laser in deuterium as set forth in claim 1, wherein said cavity mirrors are aligned after said deuterium has been cooled to said cryogenic temperature.

* * * * *